United States Patent [19]

Ohtake

[11] 4,294,146
[45] Oct. 13, 1981

[54] OSCILLATION TYPE FLYING SHEAR

[75] Inventor: Yukio Ohtake, Hitachi, Japan

[73] Assignee: Hitachi, Ltd., Tokyo, Japan

[21] Appl. No.: 136,248

[22] Filed: Apr. 1, 1980

[30] Foreign Application Priority Data

Dec. 3, 1979 [JP] Japan ................................. 54-155670

[51] Int. Cl.³ .............................................. B26D 1/56
[52] U.S. Cl. ........................................ 83/316; 83/311
[58] Field of Search ................. 83/316, 315, 317, 311, 83/324, 299, 295

[56] References Cited

U.S. PATENT DOCUMENTS 2,843,202 7/1958 Hullden .................................. 83/299
3,487,738 1/1970 Bearer .................................... 83/316

FOREIGN PATENT DOCUMENTS 52-103086 8/1977 Japan .
53-72281 6/1978 Japan .
54-16635 6/1979 Japan .

Primary Examiner—Frank T. Yost
Attorney, Agent, or Firm—Thomas E. Beall, Jr.

[57] ABSTRACT

An oscillation type flying shear of a constant cutting blade oscillation amplitude repeatedly started and shut down to effect shearing of material to specified lengths includes a device for effecting adjustments of the gear meshing position of gearing. Thus the cutting blade horizontal velocity can be made to match the velocity of the material.

5 Claims, 8 Drawing Figures

OSCILLATION TYPE FLYING SHEAR

BACKGROUND OF THE INVENTION (1) Field of the Invention

This invention relates to oscillation type flying shears, and more particularly it is concerned with an oscillation type flying shear suitable for use in shearing material to specified lengths by repeatedly starting and shutting down the shear.

(2) Description of the Prior Art

In oscillation type flying shears, it is required to make the cutter velocity match the velocity of material to be sheared in order to avoid any damage to the material to be sheared that might otherwise occur. However, since the cutting blade horizontal velocity $V_s$ undergoes changes as a cosine function of the rotational angle $\omega_t$ of the main crank shaft as indicated by the equation set forth below, it is impossible to make the cutting blade horizontal velocity $V_s$ match the velocity $V_m$ of the material to be sheared at all times during a shearing operation.

$$V_s = \pi D N_s \cos \omega t \qquad (1)$$

where $N_s V_m / L$ $N_s$: revolution of main crank shaft.

L: shearing length.

D: amplitude of oscillation of cutting blade.

Assume that the two velocities do not match when shearing is initiated or when the cutting blades bite into the material to be sheared. Then scratches would be caused by the cutting blade on the material to be sheared. On the other hand, if there are great differences between the cutting blade velocity and the peripheral velocity of means for moving the material to the shear, such as a pinch roller, after the cutting blades have bitten into the material, abrasions would be caused on the material by rubbing. Of these two injuries to the material to be sheared, scratches are of greater concern because they are caused by a sharp edge and larger in extent. Thus, since scratches causes greater trouble, it is usual practice to effect adjustments in such a manner that the cutting blade horizontal velocity matches the velocity of the material to be sheared in the position in which the cutting blades bite into the material.

In order to absorb shock and reduce the shearing force when shearing is carried out, it is also practiced to provide either the upper cutting blade or the lower cutting blade with a rake angle $\alpha$ as shown in FIG. 1 (wherein no upper cutting blade is shown). Thus when the upper and lower cutting blades are both in contact with the material 1 to be sheared, the spacing between them is varied not only by the thickness of the material 1 but also by the width thereof. If the change in the spacing between the upper and lower cutting blade that occurs from the time the cutting blades come into contact with the material 1 until the time shearing is completed is indicated as an equilibrium thickness T, then T can be expressed as follows:

$$\begin{aligned} T &= t_B + t_m \\ &= \frac{B}{2} \tan \alpha + t_m \end{aligned} \qquad (2)$$

where

B: Width of material.

$t_m$: Actual thickness of material.

Thus, in oscillation type flying shears, it is necessary that the cutting blade horizontal velocity be adjusted in accordance with the equilibrium thickness of the material to be sheared in such a manner that the cutting blade horizontal velocity matches the velocity of the material to be sheared when the cutting blade bites into the material.

There are two types of oscillation type flying shears for shearing material to specified lengths. One type is continuously operated, and the other type is repeatedly started and shut down.

In the former type of shear, there is provided means for bringing the cutting blade velocity into synchronism with the velocity of the material to be sheared at the time the cutting blade bites into the material, by varying the amplitude of oscillation of the cutting blade. This synchronizing means is complex in construction and unable to have its size reduced because of the need to have substantial strength. Thus it is impossible to reduce the amplitude of oscillation of the cutting blade and hence to reduce a minimum shearing length and to increase the changes in shearing length.

The latter type of shear includes a shear disclosed in Japanese Patent Laid-Open Publication No. 72281/78 which offers the advantage that, since the shear is capable of keeping constant the amplitude of oscillation of the cutter, the oscillating means can be reduced in size and the shearing length can be varied over a wide range of values by merely changing the interval between starting of the shear and shutting down thereof. However, the shear has the disadvantage that difficulties are encountered in adjusting the cutting blade velocity. More specifically, in the shear disclosed in the laid-open patent publication referred to hereinabove, oscillating motion is sustained by transmitting the rotation of a main crank shaft to an oscillating crank via gearing and by transmitting the eccentric rotational movement of the oscillating crank to a frame via a link. In this shear, adjustments of the frame velocity or cutting blade velocity are effected by varying the position in which the link is attached to the frame. Stated differently, the part to be adjusted is located in the frame which moves in oscillating movement and consequently no adjustments can be effected during a shearing operation. An added disadvantage is that the part to be adjusted is located in a small space between the gearing and the frame, thereby making the adjusting operation low in efficiency.

SUMMARY OF THE INVENTION

An object of the present invention is to provide an oscillation type flying shear of a constant cutting blade oscillation amplitude which is capable of readily adjusting the cutting blade horizontal velocity in a manner to make same match the velocity of the material to be sheared.

Another object is to provide an oscillation type flying shear which uses helical gears and effects adjustments of the gear meshing position by axially moving the helical gears.

Still another object is to provide an oscillation type flying shear wherein the helical gears are mounted on an oscillating crank shaft.

A further object is to provide an oscillation type flying shear comprising adjusting means attached to the upper surface or the lateral surface of the frame for the main body of the gearing.

According to the invention, there is provided an oscillation type flying shear comprising a main crank shaft driven by drive means, a frame pivotally supported by a first eccentric portion of the main crank shaft, an upper cutting blade secured to the frame, a lower cutting blade holder pivotally secured to a second eccentric portion of the main crank shaft and slidably attached to the frame, a lower cutting blade secured to the lower cutting blade holder, gearing for transmitting the rotational force of the drive means to an oscillating crank, a link for transmitting the eccentric movement of the oscillating crank to the frame as a pivotal movement, and means for adjusting the gear meshing position of gears of the gearing.

DETAILED DESCRIPTION OF THE PREFERRED EMBODIMENT

Figure 1:
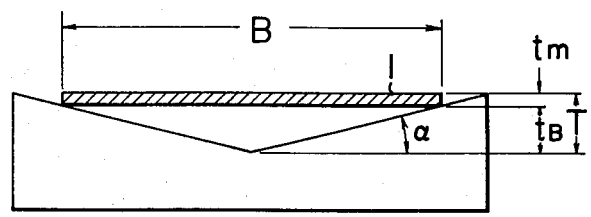
FIG. 1 is a schematic view in explanation of the equilibrium thickness of material to be sheared.
Figure 2:
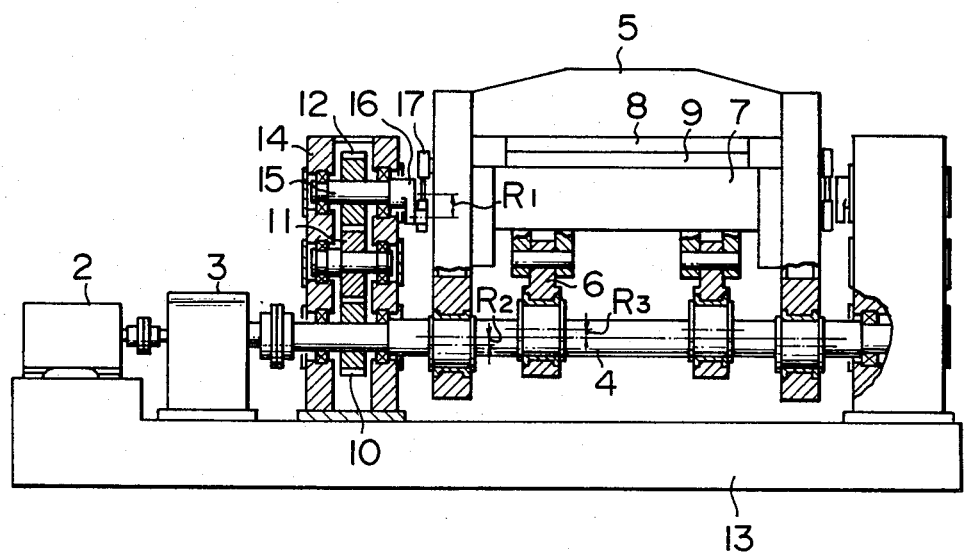
FIG. 2 is a front view of the oscillation type flying shear comprising one embodiment of the invention.
Figure 3:
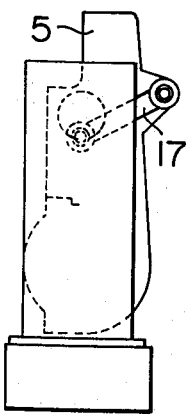
FIG. 3 is a side view of FIG. 2.

The invention will now be described by referring to a preferred embodiment shown in the drawings. FIG. 2 is a front view, with certain parts being shown in section, of the oscillation type flying shear comprising the preferred embodiment of the invention, and FIG. 3 is a side view of the shear shown in FIG. 2.

A main crank shaft 4 is driven from a DC electric motor 2 via speed reducing gearing 3. The main crank shaft 4 is formed with a first eccentric portion (of eccentricity $R_2$) and a second eccentric portion (of eccentricity $R_3$) which are distinct from each other in phase by 180°. The first eccentric portion supports a frame 5 for pivotal movement. The second eccentric portion supports connecting rods 6 for pivotal movement just like the frame 5. The connecting rods 6 have attached to the tops thereof a lower cutting blade holder 7 which is slidable within the frame 5. The frame 5 and the lower cutting blade holder 7 have secured to the lower portion and the upper portion thereof an upper cutting blade 8 and a lower cutting blade 9 respectively. By this arrangement, the upper and lower cutting blades 8 and 9 are brought into and out of contact with each other once for each complete revolution of the main crank shaft 4.

A helical gear 10 is attached to either end of the main crank shaft 4, and the rotational force of the main crank shaft 4 is transmitted, via intermediate gears 10, to helical gears 12 of the same number of teeth as the helical gears 10. These gears are housed in a gearing main body frame 14 secured to a base 13. 15 designates a rotary shaft of an oscillating crank 16 of a constant eccentricity $R_1$, and a link 17 is connected between the oscillating crank 16 and frame 5. By this arrangement, the frame 5 makes one pivotal movement for each complete revolution of the main crank shaft 4.

Figure 4:
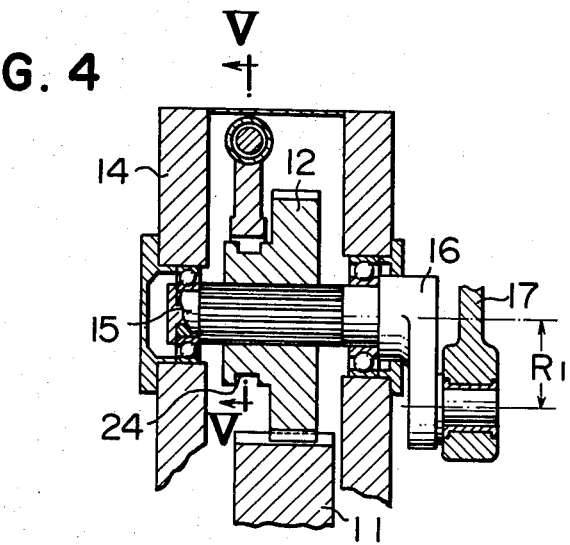
FIG. 4 is a view showing means for adjusting the eccentric portion of the main crank shaft and the eccentric portion of the oscillating crank with respect to phase.
Figure 5:
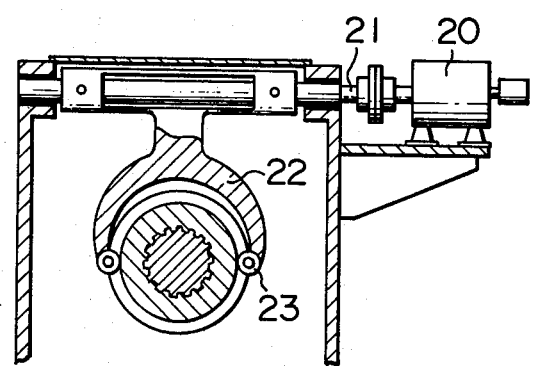
FIG. 5 is a sectional view taken along the line V—V in FIG. 4.

FIGS. 4 and 5 show in detail means for adjusting the position in which the helical gear 12 meshes with the intermediate gear 11, FIG. 4 being a front view and FIG. 5 being a view as seen in the direction of arrows V—V in FIG. 4.

20 designates a DC electric motor; 21, a shaft connected to the DC electric motor; 22, a forked pivotal arm connected to the shaft 21 by pins to rotate therewith as a unit; and 23, cam followers rotatably attached to the forward ends of the forked pivotal arms 22 and received in a groove 24 formed in the helical gear 12. The shaft 15 of the osciallating crank 16 is formed with a spline which is fitted in a spline groove formed in the helical gear 12. By this arrangement, when the DC electric motor 20 is driven, the helical gear 12 axially moves while rotating along the tooth surface of the intermediate gear 11. Thus the eccentric portion of the oscillating crank 16 can have the phase of its rotational angle displaced from the phase of the eccentric portions of the main crank shaft. The phase displacement $\gamma$ can be expressed by the following relation:

$$\gamma = 2Y \tan \beta / D_p \quad (3)$$

where $Y$: amount of axial movement of helical gear 12.

$\beta$: angle of torsion of helical gear 12.

$D_p$: Diameter of pitch circle of helical gear 12.

Figure 6:
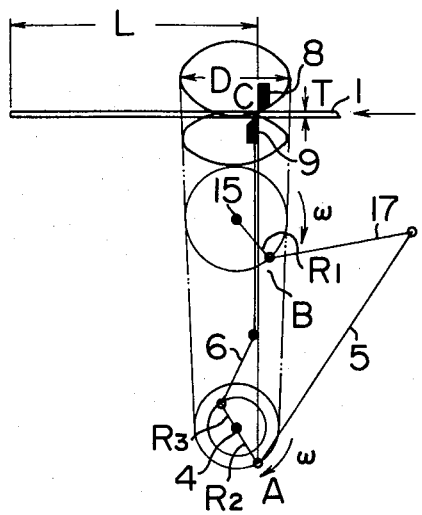
FIG. 6 shows a model of the oscillation type flying shear.
Figure 7:
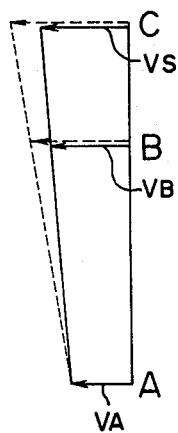
FIG. 7 shows the principle of velocity change.

FIG. 6 shows a model of the oscillation type flying shear, and FIG. 7 shows the interrelation of the velocities $V_A$, $V_B$ and $V_S$ of the first eccentric portion of main crank shaft, the eccentric portion of oscillating crank and the cutting blade in positions A, B and C respectively. In the figure, a solid line indicates the case of $\gamma = 0$. The velocity $V_A$ of the first eccentric portion at A has nothing to do with $\gamma$ and can be expressed as $V_A = 2\pi R_2 \cos \omega t$. The velocity $V_B$ of the eccentric portion of oscillating crank at B is a function of $\gamma$ and can be expressed by the following equation:

$$V_B = 2\pi R \cos (\omega t + \gamma) \quad (4)$$

Thus the velocity $V_B$ can be varied as indicated by a broken line by changing the value of $\gamma$, so that the cutting blade horizontal velocity $V_S$ can also be varied.

Figure 8:
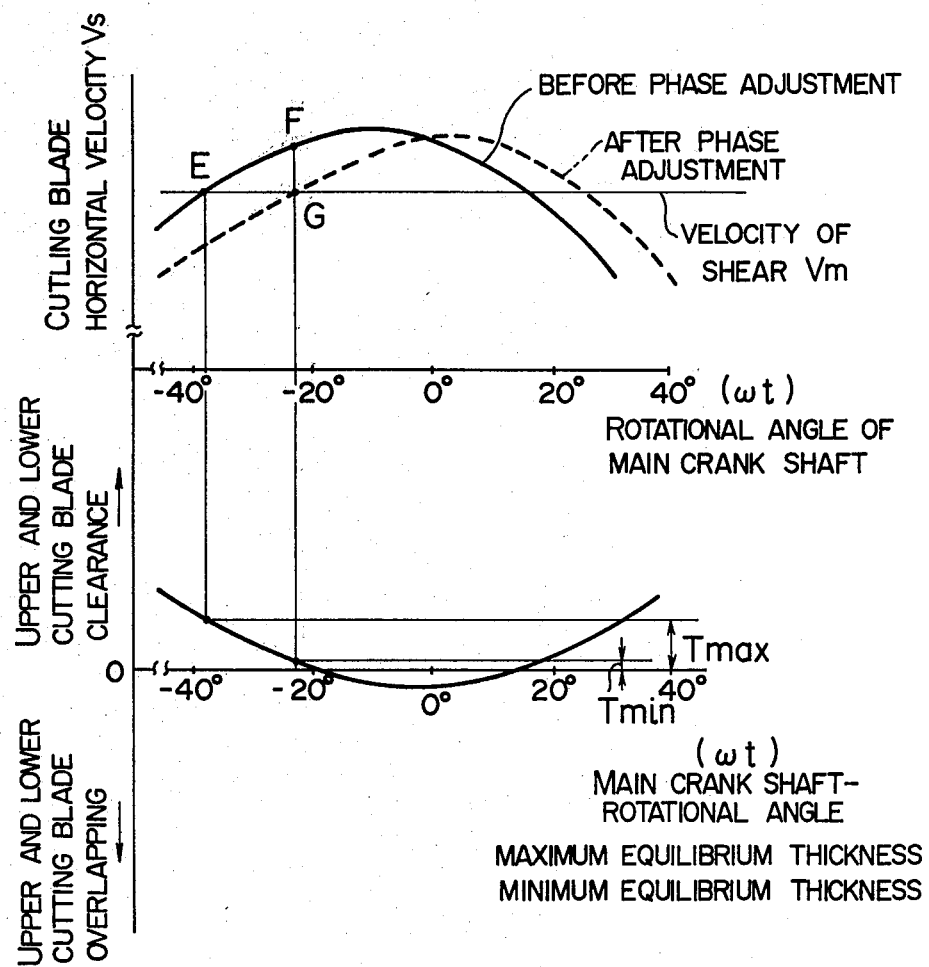
FIG. 8 is a graph showing the rotational angle of the main crank shaft in relation to the cutting blade horizontal velocity and the upper and lower cutting blade gap.

In this way, the cutting blade horizontal velocity $V_S$ can be varied with respect to the rotational angle $\omega t$ of the main crank shaft by adjusting the value of $\gamma$. Thus even if the equivalent thickness of the material to be sheared shows a variation, it is possible to make the cutting blade horizontal velocity match the velocity of the material to be sheared when the cutting blades bite into the material. This will be explained by referring to FIG. 8. Assume that the amount of eccentricity $R_1$ of the oscillating crank is selected beforehand in such a manner that the cutting blade horizontal velocity matches the velocity of the material to be sheared at a point E when the material has a maximum equilibrium thickness $T_{max}$, as shown in the figure. If material of a minimum equilibrium thickness $T_{min}$ is sheared in this condition, the point of initiation of shearing is at a point F and no agreement in velocity is obtainable when the cutting blades bite into the material. However, if the value of $\gamma$ is adjusted and the cutting blade horizontal velocity is varied with respect to the rotational angle of the main crank shaft as indicated by a broken line, it is possible to make the cutting blade horizontal velocity match the velocity of the material at a point G.

The embodiment of the invention shown and described hereinabove offers the following advantages:

(1) It is possible to readily adjust the velocity even while shearing is being practiced because the cutting blade horizontal velocity is adjusted by varing the meshing of the gears of gearing which do not oscillate during a shearing operation.

(2) Adjusting operations can be performed in a space of large area becuase gear meshing position adjusting means is located on a lateral surface of the main body frame of the gearing opposite the frame.

(3) The cutting blade horizontal velocity can be varied independently of the oscillating motion of the frame because helical gears are used and gear meshing position is adjusted by moving the helical gears axially thereof.

What is claimed is:

1. An oscillation type flying shear comprising:
   a main crank shaft driven by drive means;
   a frame pivotally supported by a first eccentric portion of said main crank shaft;
   an upper cutting blade secured to said frame;
   a lower cutting blade holder pivotally secured to a second eccentric portion of said main crank shaft and slidably attached to said frame;
   a lower cutting blade secured to said lower cutting blade holder;
   gearing for transmitting the rotational force of said drive means to an oscillating crank; and
   a link for transmitting the eccentric movement of said oscillating crank to said frame as a pivotal movement; the improvement comprising means for adjusting the gear meshing position of gears of said gearing.

2. An oscillation type flying shear as claimed in claim 1, wherein said gearing comprises helical gearings and at least one of said helical gears is axially movable, and wherein the axial position of said axially movable helical gear is determined by said gear meshing position adjusting means.

3. An oscillation type flying shear as claimed in claim 2, wherein said axially movable helical gear is mounted on a shaft of said oscillating crank.

4. An oscillation type flying shear as claimed in claim 2 or 3, wherein said gear meshing position adjusting means is mounted on an upper surface of a main body frame of said gearing.

5. An oscillation type flying shear as claimed in claim 2 or 3, wherein said gear meshing position adjusting means is mounted on a lateral surface of a main body frame of said gearing opposite said frame.

* * * * *